United States Patent
Kondou et al.

(10) Patent No.: US 9,015,535 B2
(45) Date of Patent: *Apr. 21, 2015

(54) INFORMATION PROCESSING APPARATUS HAVING MEMORY DUMP FUNCTION, MEMORY DUMP METHOD, AND RECORDING MEDIUM

(71) Applicant: Fujitsu Limited, Kawasaki-shi, Kanagawa (JP)

(72) Inventors: Hiroshi Kondou, Yokohama (JP); Kenji Okano, San Jose, CA (US)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/926,423

(22) Filed: Jun. 25, 2013

(65) Prior Publication Data

US 2013/0290790 A1    Oct. 31, 2013

Related U.S. Application Data

(63) Continuation of application No. PCT/JP2010/073637, filed on Dec. 27, 2010.

(51) Int. Cl.
G06F 11/07    (2006.01)
G06F 11/14    (2006.01)

(52) U.S. Cl.
CPC ........ *G06F 11/0778* (2013.01); *G06F 11/1438* (2013.01); *G06F 11/0793* (2013.01); *G06F 11/0712* (2013.01); *G06F 11/0724* (2013.01)

(58) Field of Classification Search
CPC ............ G06F 11/0793; G06F 11/0778; G06F 11/1438; G06F 11/1441
USPC .......................................... 714/23, 24, 38.11
See application file for complete search history.

(56) References Cited

U.S. PATENT DOCUMENTS 6,189,111 B1 *   2/2001   Alexander et al. ........... 714/6.13
6,718,383 B1 *   4/2004   Hebert .......................... 709/224

(Continued)

FOREIGN PATENT DOCUMENTS

EP    1 341 085    9/2003
EP    1 638 000    3/2006

(Continued)

OTHER PUBLICATIONS

PCT International Search Report mailed Mar. 29, 2011 in corresponding International Application No. PCT/JP2010/073637.
PCT International Preliminary Report on Patentability mailed Jul. 11, 2013 in corresponding International Application No. PCT/JP2010/073637.
Japanese Office Action mailed Mar. 25, 2014 in corresponding Japanese Patent Application No. 2012-550617.

(Continued)

*Primary Examiner* — Chae Ko
(74) *Attorney, Agent, or Firm* — Staas & Halsey LLP

(57) ABSTRACT

An information processing apparatus that executes an operating system, the apparatus including a panic process unit configured to stop the operating system when the operating system has detected an error, a mapping process unit configured to assign, to the operating system stopped by the panic process unit, a second memory area which is other than a first memory area being used by a kernel of the operating system before stop or by a hypervisor that controls the operating system before stop of the operating system, a reactivation process unit configured to reactivate the operating system by using the second memory area as a usage area, and a memory dump process unit configured to read data in the first memory area, and to write the data to a dump file after the operating system is reactivated.

18 Claims, 6 Drawing Sheets

(56) References Cited

U.S. PATENT DOCUMENTS

| | | | | |
|---|---|---|---|---|
| 7,464,378 | B1* | 12/2008 | Limaye et al. | 718/100 |
| 7,698,390 | B1* | 4/2010 | Harkness et al. | 709/220 |
| 7,877,358 | B2* | 1/2011 | Ritz et al. | 707/640 |
| 8,069,218 | B1 | 11/2011 | Tormasov et al. | |
| 8,086,906 | B2* | 12/2011 | Ritz et al. | 714/48 |
| 8,555,110 | B2* | 10/2013 | Shimose | 714/13 |
| 2003/0163744 | A1* | 8/2003 | Yamazaki | 713/300 |
| 2004/0221036 | A1* | 11/2004 | Smith | 709/225 |
| 2006/0069944 | A1* | 3/2006 | Oguma | 714/5 |
| 2006/0248384 | A1* | 11/2006 | Safford | 714/11 |
| 2007/0006226 | A1 | 1/2007 | Hendel | |
| 2007/0094659 | A1 | 4/2007 | Singh et al. | |
| 2007/0101191 | A1 | 5/2007 | Iwama | |
| 2008/0133968 | A1 | 6/2008 | Muoppirala et al. | |
| 2008/0307425 | A1* | 12/2008 | Tripathi | 718/104 |
| 2009/0113034 | A1* | 4/2009 | Krishnappa et al. | 709/223 |
| 2009/0217087 | A1* | 8/2009 | Nakajima | 714/13 |
| 2010/0162052 | A1 | 6/2010 | Shimogawa | |
| 2011/0225458 | A1 | 9/2011 | Zuo et al. | |
| 2011/0289343 | A1* | 11/2011 | Schaefer et al. | 714/4.1 |
| 2012/0023209 | A1* | 1/2012 | Fletcher et al. | 709/223 |

FOREIGN PATENT DOCUMENTS

| | | |
|---|---|---|
| EP | 2 453 359 | 5/2012 |
| JP | 07-234808 | 9/1995 |
| JP | 10-133918 | 5/1998 |
| JP | 11-212836 | 8/1999 |
| JP | 2001-229053 | 8/2001 |
| JP | 2001-290678 | 10/2001 |
| JP | 2003-256396 | 9/2003 |
| JP | 2005-122334 | 5/2005 |
| JP | 2006-72931 | 3/2006 |
| JP | 2006-172100 | 6/2006 |
| JP | 2007-133544 | 5/2007 |

OTHER PUBLICATIONS

"Kernel Memory Management", Yasui, Nikkei Linux, Nikkei Business Publications, Inc., Jan. 8, 2004, vol. 6, No. 1, pp. 123-130.
Extended European Search Report dated Jun. 13, 2014 in corresponding European Patent Application No. 10861466.0.
"Improving operating system crash dump performance on a virtual machine", Research Disclosure, Mason Publications, Hampshire GB vol. 519, No. 77, Jul. 1, 2007, 4pp.
Japanese Office Action mailed Sep. 2, 2014, in corresponding Japanese Patent Application No. 2012-550617.
European Search Report mailed Jul. 1, 2013 in corresponding European Application No. 09847046.1-1951.
U.S. Appl. No. 13/342,633, filed Jan. 3, 2012, Hiroshi Kindou, et al., Fujitsu Limited.
U.S. Appl. No. 13/902,849, filed May 26, 2013, Hiroshi Kindou, et al., Fujitsu Limited.
European Search Report mailed Jun. 6, 2014 in corresponding European Application No. 13169691.6-1951.
European Search Report mailed Jul. 1, 2014 in corresponding European Application No. 09847046.1-1951.
PCT/ISA/210 mailed Sep. 15, 2009 in corresponding International Application PCT/JP2009/003257.
U.S. Office Action mailed Mar. 24, 2014 in corresponding U.S. Appl. No. 13/342,633.
U.S. Office Action mailed Sep. 23, 2013 in corresponding U.S. Appl. No. 13/342,633.
Taiwanese Office Action dated Dec. 1, 2014 in corresponding Taiwanese Patent Application No. 102118623.
U.S. Office Action dated Jan. 2, 2015 in co-pending U.S. Appl. No. 13/902,849.
Korean Office Action dated Jan. 6, 2015 in corresponding Korean Patent Application No. 10-2013-0069068.
Japanese Office Action dated Jan. 20, 2015 in corresponding Japanese Patent Application No. 2012-550617.

* cited by examiner

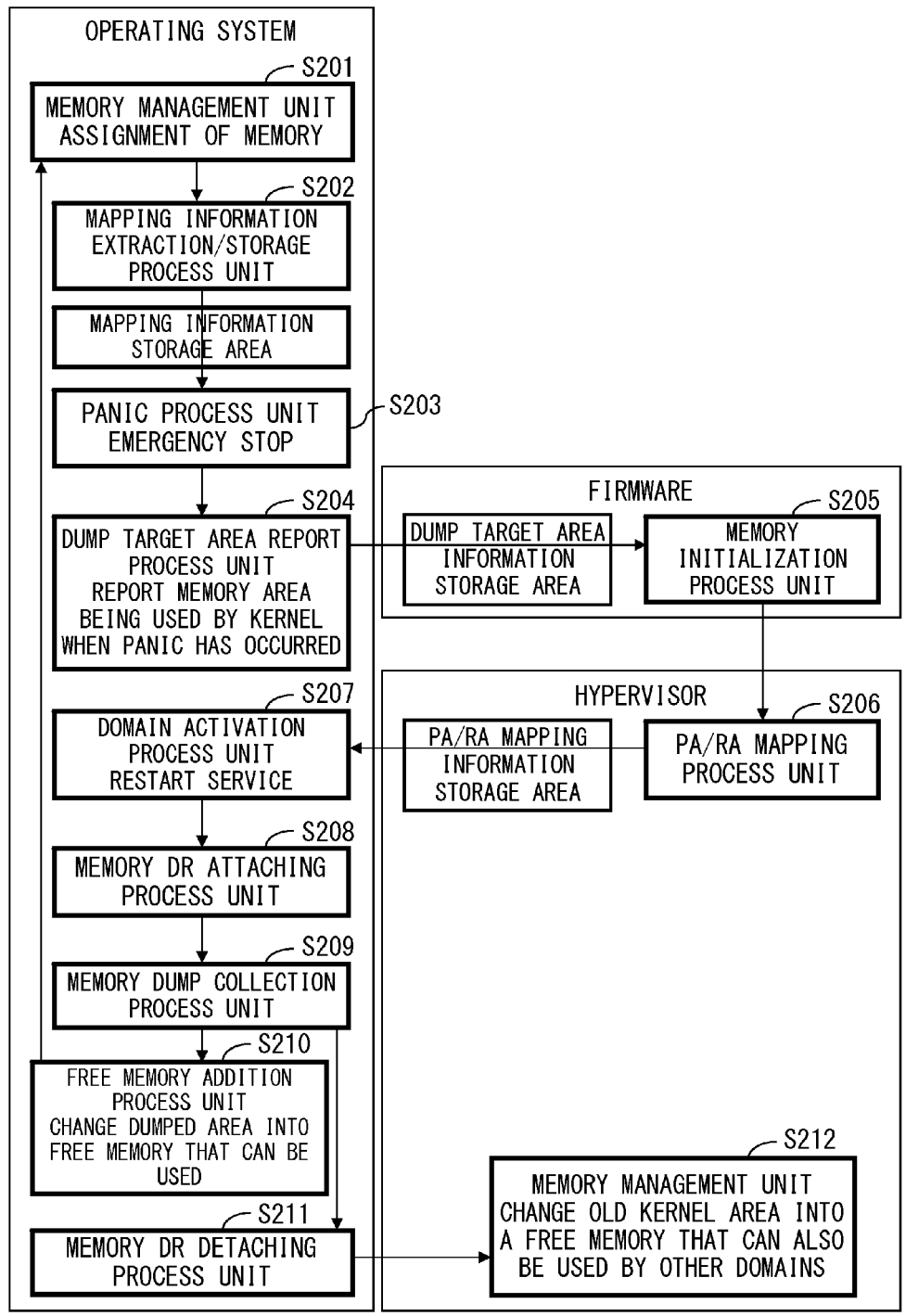
F I G. 3

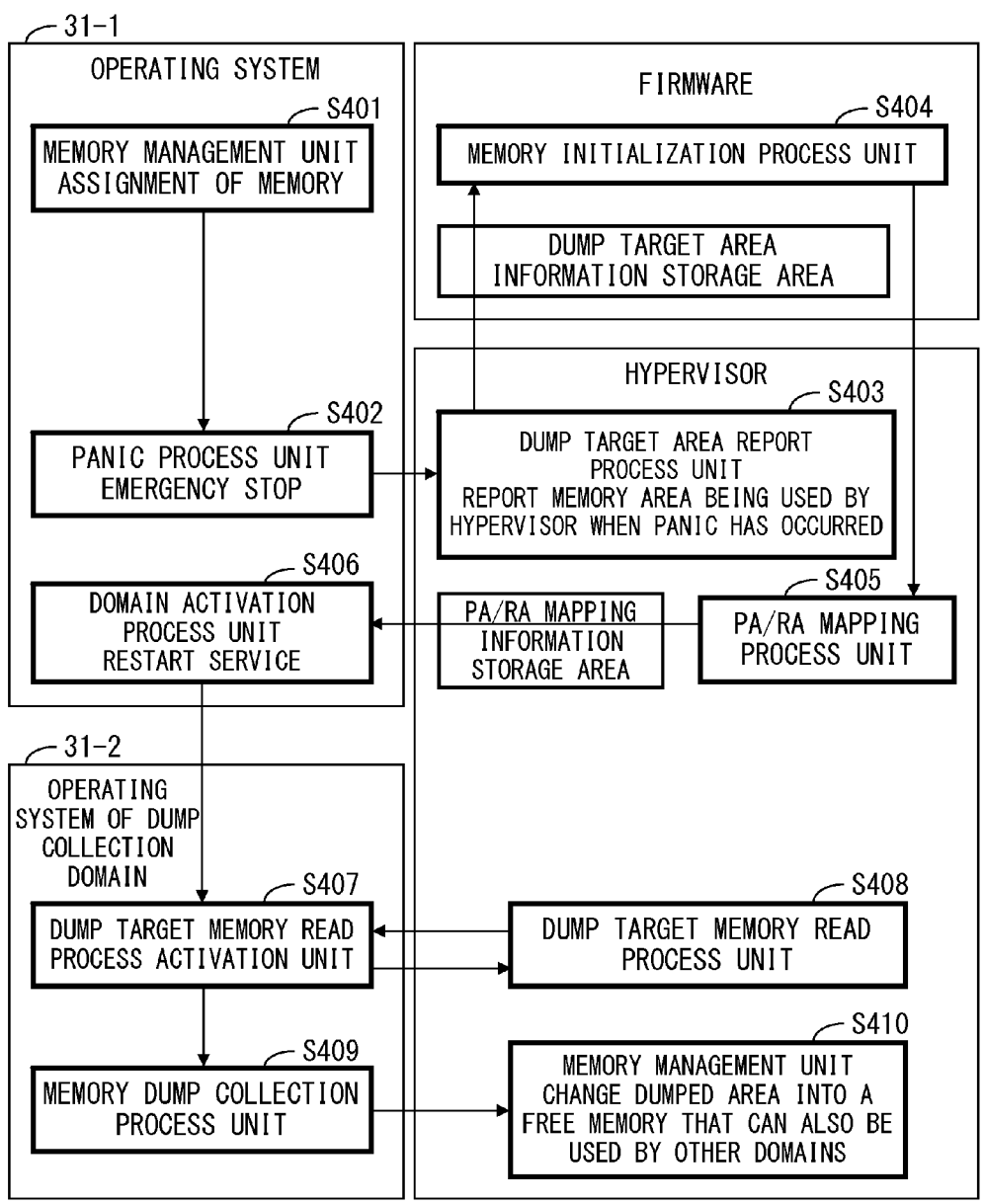
F I G. 5

INFORMATION PROCESSING APPARATUS HAVING MEMORY DUMP FUNCTION, MEMORY DUMP METHOD, AND RECORDING MEDIUM

CROSS-REFERENCE TO RELATED APPLICATION

This application is a continuation of PCT application of PCT/JP2010/073637, which was filed on Dec. 27, 2010.

FIELD

The embodiments discussed herein are related to an information processing apparatus including a memory dump function, to a memory dump method, and to a recording medium.

BACKGROUND

In recent years, accompanying the introduction of UNIX (registered trademark) servers and IA serves to core systems, the high availability of UNIX (registered trademark) servers and IA servers has been emphasized. As a general rule, when a fatal error has occurred in a system, the system is brought to an emergency stop (panic), and memory dumps are stored in a disk so as to determine the cause.

While a system is in a shutdown state, it is not possible to use that system, and accordingly it is important to be able to reactivate the system promptly.

However, in recent years, servers mounting memories with a capacity on the order of terabytes (TB) have emerged, and collecting memory dumps in such systems takes a long period of time, preventing prompt reactivation of systems.

A method in which memory contents at the time of the occurrence of a panic are stored in another memory without storing memory dumps in a disk is known. Also, a method in which memory contents are partially stored when memory contents at the time of the occurrence of a failure are stored in a dump storage area and memory contents that were not stored are converted into a dump file after reactivation is known.

The above described conventional methods store memory dumps at the time of the occurrence of failure in a different memory or a disk, taking a long period of time to copy the memory when memory dumps to be stored are of a large size, and systems cannot be promptly reactivated, which is problematic.

Also, when an operating system has detected a fatal error and has stopped the system, the operating system which detected the abnormality collects dumps, and sometimes detects the abnormality again during the dump collection operation to cause secondary damage such as hang-ups, which is problematic.

Patent Document 1: Japanese Laid-open Patent Publication No. 11-212836
Patent Document 2: Japanese Laid-open Patent Publication No. 2001-229053
Patent Document 3: Japanese Laid-open Patent Publication No. 2006-72931
Patent Document 4: Japanese Laid-open Patent Publication No. 2005-122334

SUMMARY

According to an aspect of the invention, an information processing apparatus according to one aspect of the embodiments is an information processing apparatus that executes an operating system, the apparatus including a panic process unit, a mapping process unit, a reactivation process unit, and a memory dump process unit.

The panic process unit is configured to stop the operating system when the operating system has detected an error.

The mapping process unit is configured to assign, to the operating system stopped by the stop process unit, a second memory area which is other than a first memory area being used by a kernel of the operating system before stop or by a hypervisor that controls the operating system before stop of the operating system.

The reactivation process unit is configured to reactivate the operating system by using the second memory area as a usage area.

The memory dump process unit is configured to read data in the first memory area, and to write the data to a dump file after the operating system is reactivated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a memory dump generation process according to a second embodiment;
FIG. 5 illustrates a memory dump generation process according to a fourth embodiment.

DESCRIPTION OF EMBODIMENTS

Figure 1A:
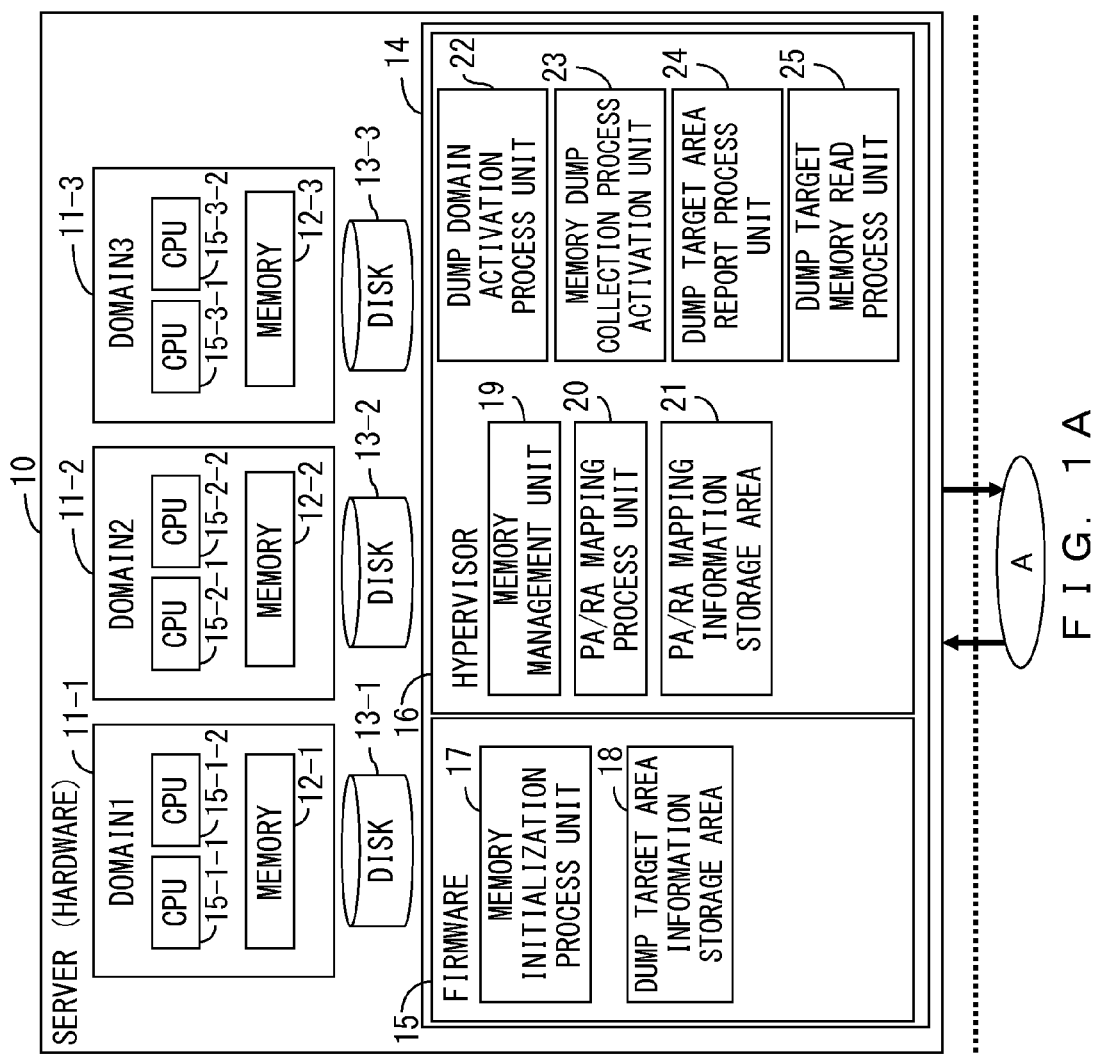
FIG. 1A illustrates configurations of a server and an OS according to the present embodiment.

Hereinafter, the embodiments of the present invention will be explained by referring to the drawings.

Figure 1B:
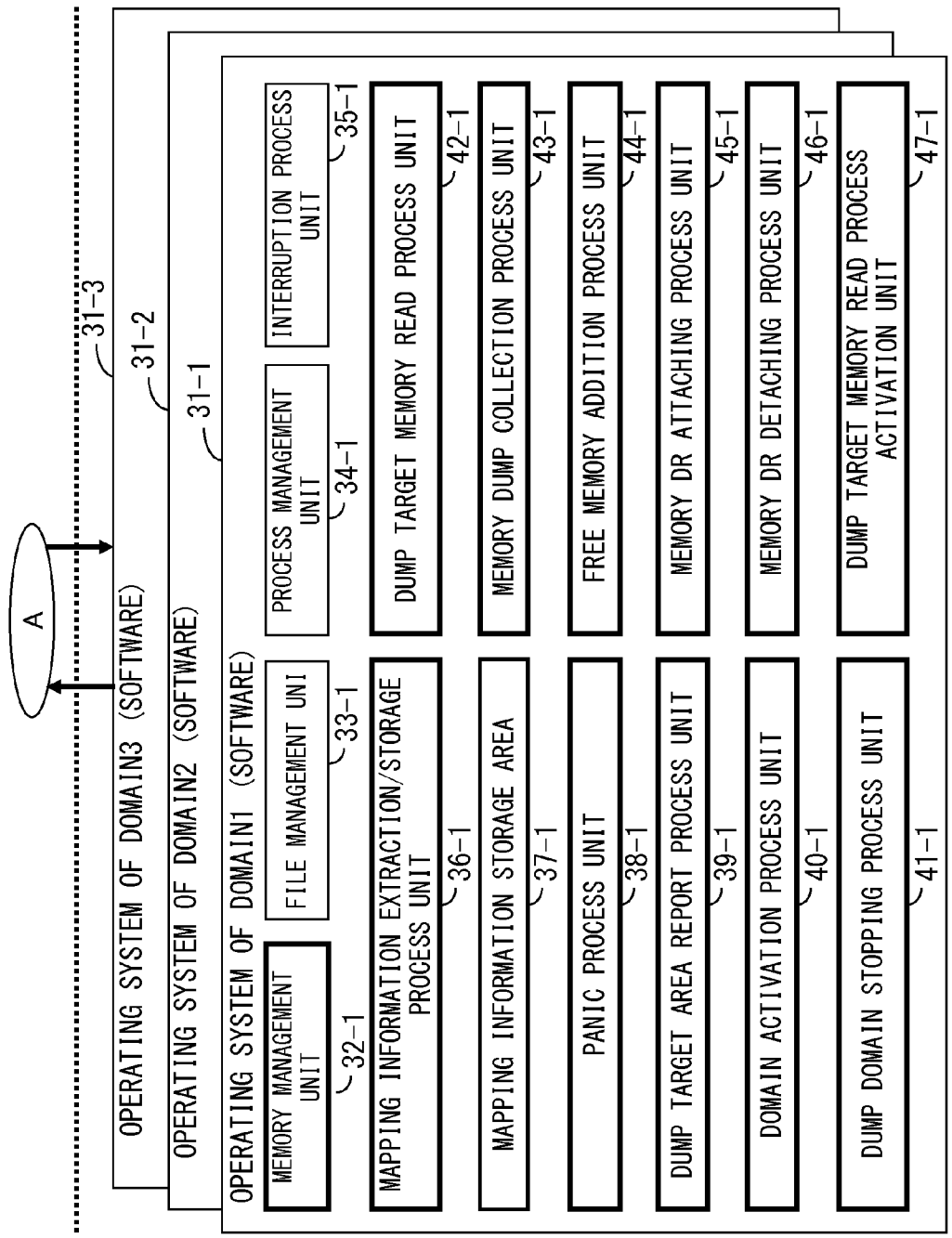
FIG. 1B illustrates configurations of a server and an OS according to the present embodiment.

FIGS. 1A and 1B illustrate configurations of a server and an OS according to the present embodiment.

The configurations of the server and the OS according to an embodiment in FIGS. 1A and 1B are common to first through fourth embodiments, which will be described later.

A server (information processing apparatus) 10 includes domains 11-$i$ (i=1 through 3), disks 13-$i$, and a storage unit 14.

In the explanations below, the domains 11-1 through 11-3 may also be referred to as domain1 through domain3, respectively.

The domains 11-$i$ each include Central Processing Units (CPUs) 15-$i$-$k$ (k=1, 2), and memories 12-$i$.

The CPUs 15-$i$-$k$ execute various processes.

The memories 12-$i$ read various programs or data from the disks 13-$i$, and store them.

The storage units 14 store firmware 15 and a hypervisor 16. The storage units 14 are, for example, a Random Access Memory (RAM) or a Read Only Memory (ROM).

The firmware 15 includes a memory initialization process unit 17 and a dump target area information storage area 18.

The memory initialization process unit 17 initializes the memories 12-$i$.

The dump target area information storage area 18 stores information of a memory area, more specifically the initial block and size of the memory area, being used by the kernel and the hypervisor 16.

The hypervisor 16 controls operating systems (OSs) 31-*i* installed in the server 10.

The hypervisor 16 includes a memory management unit 19, a PA/RA mapping process unit 20, a PA/RA mapping information storage area 21, a dump domain activation process unit 22, a memory dump collection process activation unit 23, a dump target area report process unit 24, and a dump target memory read process unit 25.

The memory management unit 19 manages memories.

The PA/RA mapping process unit 20 performs mapping between physical addresses (PAs) and real addresses (RAs). A PA is a physical address of a memory, and an RA is a real address of a domain (operating system).

The PA/RA mapping information storage area 21 stores information on mapping between PAs and RAs.

The dump domain activation process unit 22 activates the domain 11.

The memory dump collection process activation unit 23 calls a memory dump collection process unit 44.

The dump target area report process unit 24 reports to the firmware 15 the initial address and size of the memory area being used by the hypervisor 16 at the time of the occurrence of a panic.

The dump target memory read process unit 25 reads the memory area as a dump target.

FIG. 1B illustrates function blocks of the OS 31.

The OSs 31-*i* have been installed in the server 10.

The OSs 31-*i* are the operating systems of the domains 11-*i*, respectively.

The OSs 31-*i* include memory management units 32-*i*, file management units 33-*i*, process management units 34-*i*, interruption process units 35-*i*, mapping information extraction/storage process units 36-*i*, mapping information storage areas 37-*i*, panic process units 38-*i*, dump target area report process units 39-*i*, domain activation process units 40-*i*, dump domain stopping process unit 41-*i*, dump target memory read process units 42-*i*, memory dump collection process units 43-*i*, free memory addition process units 44-*i*, memory DR attaching process units 45-*i*, memory DR detaching process units 46-*i*, and dump target memory read process activation units 47-*i*.

In FIGS. 1A and 1B, the OSs 31-*i* have a common configuration, and thus a detailed configuration of only the OS 31-1 is illustrated, omitting the configurations of the operating systems 31-2 and 31-3.

The memory management unit 32 assigns the memory 12 to be used by the operating system 31.

The file management unit 33-1 manages a file, which is data stored in a disk.

The process management unit 34-1 manages processes of programs executed by the OS 31-1.

The interruption process unit 35-1 performs interruption processes.

The mapping information extraction/storage process unit 36-1 writes to the mapping information storage area 37 information necessary to collect and analyze dumps of the memory 12.

Examples of information written by the mapping information extraction/storage process units 36-1 to the mapping information storage area 37 include mapping information (logical address, physical address, size, or the like) of each segment such as a text area of the kernel, a data area, a heap area, a stack area, etc., and mapping information of each control table such as an address conversion table, a page table, etc.

The panic process unit 38 brings the domain 11-1 to an emergency stop (panic).

The dump target area report process unit 39-1 reports, to the firmware, information (combination of initial address and size) of the memory area (dump target area) being used by the kernel of the OS 31-1 and the hypervisor 16 at the time of the occurrence of the emergency stop.

A domain activation process unit 40-1 activates the OS 31-1.

The dump domain stopping process unit 41-1 stops the domain in which dumps are collected.

A dump target memory read process unit 42-1 reads the memory area used by the kernel or the hypervisor before reactivation.

A memory dump collection process unit 43-1 reads data in the memory area used by the kernel, and generates a dump file.

A free memory addition process unit 44-1 reports to the memory management unit 32 a dumped memory area.

A memory DR attaching process unit 45-1 attaches a memory area in the domain 11-1.

A memory DR detaching process unit 46-1 detaches the memory area from the domain 11-1.

The dump target memory read process activation unit 47-1 activates the dump target memory read process unit 25.

Figure 2:
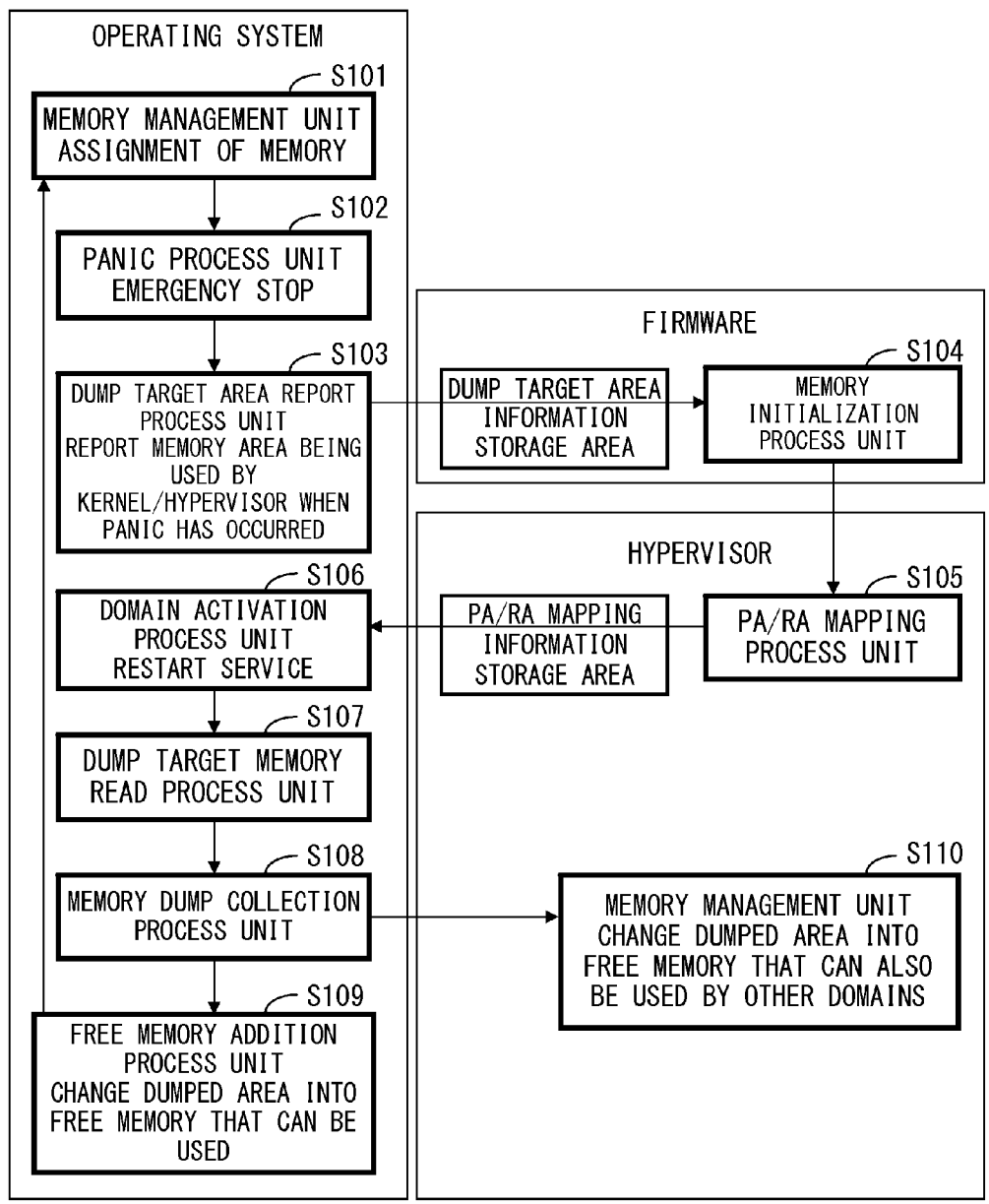
FIG. 2 illustrates a memory dump generation process according to a first embodiment.

FIG. 2 illustrates a memory dump generation process according to the first embodiment.

In the first embodiment, explanations will be given for a case where memory dumps are collected in the OS 31-1 (domain 11-1).

In step S101, the memory management unit 32 assigns a memory to be used by the kernel from the smallest (or the highest) real address (RA) in the memory 12-1. In this method, the size of a memory area (dump target area) used by the kernel is made to be as small as possible.

In step S102, when the OS 31-1 has detected a fatal error, the panic process unit 38-1 brings the OS 31-1 (domain 11-1) to an emergency stop (panic).

In step S103, the dump target area report process unit 39-1 reports, to the firmware 15, information (combination of initial address and size) of a memory area being used by the kernel of the OS 31-1 and/or the hypervisor 16 when the emergency stop (panic) has occurred. When a memory area being used by the kernel and/or the hypervisor has been divided into a plurality of blocks, the initial addresses and sizes of all blocks are reported. The firmware 15 stores information of the dump target area in the dump target area information storage area 18.

In step S104, the memory initialization process unit 17 does not execute an initialization process on the memory area (dump target area) being used by the kernel and/or hypervisor at the time of the occurrence of the emergency stop (panic) (i.e., data is not updated). In other words, the memory area being used by the kernel and/or the hypervisor at the time of the occurrence of the emergency stop (panic) is kept as it is.

In step S105, the PA/RA mapping process unit 20 changes, as described in (1) and (2) below, the mapping between the physical address (PA) and the read address (RA) of the memory 12-1 of the domain 11-1 that has been brought to a panic. Thereby, even when the OS 31-1 is reactivated, data in the memory area being used by the kernel and/or the hypervisor 16 at the time of the occurrence of the panic is not overwritten.

(1) The physical address of the memory being used by the kernel and/or hypervisor at the time of the occurrence of the panic is not assigned to the real address of the domain (operating system) to be reactivated; and (2) The memory sizes that can be used by that domain (operating system) are made sure to be as identical to each other as possible before and after the reactivation.

However, when a physical memory that can be assigned to the domain (operating system) to be reactivated is smaller than a prescribed value, (1) is given a priority.

In step S106, the domain activation process unit 40-1 does not write dumps of the memory used by the kernel and/or the hypervisor to a disk or the like, and activates the OS 31-1.

In step S107, after the OS 31-1 is reactivated so as to restart its service, the dump target memory read process unit 42-1 reads the memory area (dump target area) being used by the kernel and/or the hypervisor 14 at the time of the occurrence of a panic. Also, information of the dump target area (initial address, size, or the like) is read from the dump target area information storage area 18 or is obtained through a report from the firmware 15 or the hypervisor 16.

In step S108, the memory dump collection process unit 43-1 writes the read data to a file so as to generate a dump file.

Next, step S109 or step S110 is executed.

In step S109, after generating a dump file, the free memory addition process unit 44-1 transmits a report to the memory management unit 32-1 so as to request that the memory management unit 32-1 change the memory area being used by the kernel and/or the hypervisor 14 at the time of the occurrence of a panic (i.e., a dumped area) into an unoccupied area that can be used, i.e., a free memory. The memory management unit 32-1 changes the dumped area into a free memory.

In step S110, the memory management unit 19 of the hypervisor 16 changes the memory area (dumped area) being used by the kernel and/or the hypervisor 16 at the time of the occurrence of the panic into a free memory that can also be used by other domains 11-2 and 11-3 (operating systems 31-2 and 31-3).

According to the first embodiment, when an error is detected and a domain (operating system) is brought to an emergency stop (panic), the domain (operating system) can be reactivated promptly because information is not copied to a different memory or the like even when the size of memory dumps is large. Thereby, it is possible to reduce a period of time during which the service is suspended.

Next, a second embodiment will be explained.

In the second embodiment, after reactivating a domain (operating system) so as to restart its service after a panic, the reactivated domain (operating system) attaches a memory area being used by the kernel at the time of the occurrence of a panic by using the Memory Dynamic Reconfiguration (DR) function so as to collect memory dumps of the kernel.

FIG. 3 illustrates a memory dump generation process according to the second embodiment.

In the second embodiment, explanations will be given for a case where memory dumps are collected in the OS 31-1 (domain 11-1).

In step S201, upon the activation of the OS 31-1, the memory management unit 32 assigns a memory used by the kernel from the smallest (or highest) real address (RA) in the memory 12-1. In this method, the size of a memory area (dump target area) used by the kernel is made to be as small as possible.

In step S202, the mapping information extraction/storage process unit 36-1 writes, to the mapping information storage area 37-1 in a memory, information necessary to collect/analyze dumps of the memory used by the kernel (for example, a text area of the kernel, a data area, a heap area, a stack area, etc.), mapping information of each segment (a physical address, a logical address, a size, etc.), an address conversion table, a page table, and mapping information of various control tables.

In step S203, when the OS 31-1 has detected a fatal error, the panic process unit 38-1 brings the OS 31-1 (domain 11-1) to an emergency stop (panic).

In step S204, the dump target area report process unit 39-1 reports to the firmware 15 information (a combination of the initial address and size) of the memory area being used by the kernel of the OS 31-1 at the time of the occurrence of the emergency stop (panic). When the memory area being used by the kernel has been divided into a plurality of blocks, the initial addresses and sizes of all of the blocks are reported. The firmware 15 stores information of the dump target area in the dump target area information storage area 18.

In step S205, the memory initialization process unit 17 does not execute an initialization process on a dump target area being used by the kernel at the time of the occurrence of the emergency stop (panic) (i.e., data is not updated). In other words, a memory area being used by the kernel at the time of the occurrence of the emergency stop (panic) is kept as it is.

In step S206, the PA/RA mapping process unit 20 changes, in a manner described as (1) and (2) below, the mapping between the physical address (PA) and the read address (RA) of the memory 12-1 of the domain 11-1 that has been brought to a panic. Thereby, even when the OS 31-1 is reactivated, data in the memory area being used by the kernel at the time of the occurrence of the panic is not overwritten.

(1) The physical address of the memory being used by the kernel at the time of the occurrence of the panic is not assigned to the real address of the domain (operating system) to be reactivated; and (2) The memory sizes that can be used by that domain (operating system) are made sure to be as identical to each other as possible before and after the reactivation.

However, when a physical memory that can be assigned to the domain (operating system) to be reactivated is smaller than a prescribed value, (1) is given a priority.

In step S207, the domain activation process unit 40-1 does not write dumps of the memory used by the kernel to a disk or the like, and reactivates the OS 31-1.

In step S208, after the OS 31-1 is reactivated so as to restart its service, the memory DR attaching process unit 45-1 attaches the memory area (dump target area) being used by the kernel at the time of the occurrence of a panic to the domain 11-1 (OS 31-1). Also, information of the dump target area (initial address, size, or the like) is read from the dump target area information storage area 18 or is obtained through a report from the firmware 15 or the hypervisor 16.

In step S209, the memory dump collection process unit 43-1 reads the attached memory area to generate a dump file.

Next, step S210 or step S211 and step S212 are executed.

In step S210, after generating a dump file, the free memory addition process unit 44-1 transmits a report to the memory management unit 32-1 so as to request that the memory management unit 32-1 change the memory area being used by the kernel at the time of the occurrence of a panic (i.e., a dumped area) into an unoccupied area that can be used, i.e., a free memory. The memory management unit 32-1 changes the dumped area into a free memory.

In step S211, the memory DR detaching process unit 46-i-1 uses the Memory Dynamic Reconfiguration (DR) function of the memory to detach the memory area being used by the kernel at the time of the occurrence of a panic from the domain 11-1 (OS 31-1), and transmits to the memory management unit 19 an instruction to change the detached area into a free memory.

In step S212, the memory management unit 19 of the hypervisor 16 changes the memory area (dumped area) being used by the kernel at the time of the occurrence of the panic into a free memory that can also be used by other domains 11-2 and 11-3 (operating systems 31-2 and 31-3).

According to the second embodiment, when an error is detected and a domain (operating system) is brought to an emergency stop (panic), the domain (operating system) can be reactivated promptly because information is not copied to a different memory or the like even when the size of memory dumps are large. Thereby, it is possible to reduce a period of time during which the service is suspended.

Also, according to the second embodiment, when memory dumps are collected by using the memory Dynamic Reconfiguration function, a new operating system after reactivation, not an operating system that detected an abnormality, collects dumps, reducing the possibility that secondary damage will be caused, such as in a case where an abnormality is detected again in the dump collection process, causing a hang-up.

Next, explanations will be given for a third embodiment.

In the third embodiment, when a domain (operating system) has been reactivated to restart its service after the occurrence of a panic, the memory area being used by the kernel at the time of the occurrence of the panic is assigned to a domain (operating system) different from the domain (operating system) that caused the panic (referred to as a dump collection domain or a dump collection operating system), and the memory being used by the kernel at the time of the occurrence of the panic is read in the dump collection domain (dump collection operating system) so as to generate a dump file.

In the explanations below, it is assumed that the domain that was brought to a panic is domain 11-1 (operating system 31-1), and the dump collection domain (dump collection operating system) is the domain 11-2 (operating system 31-2).

Figure 4:
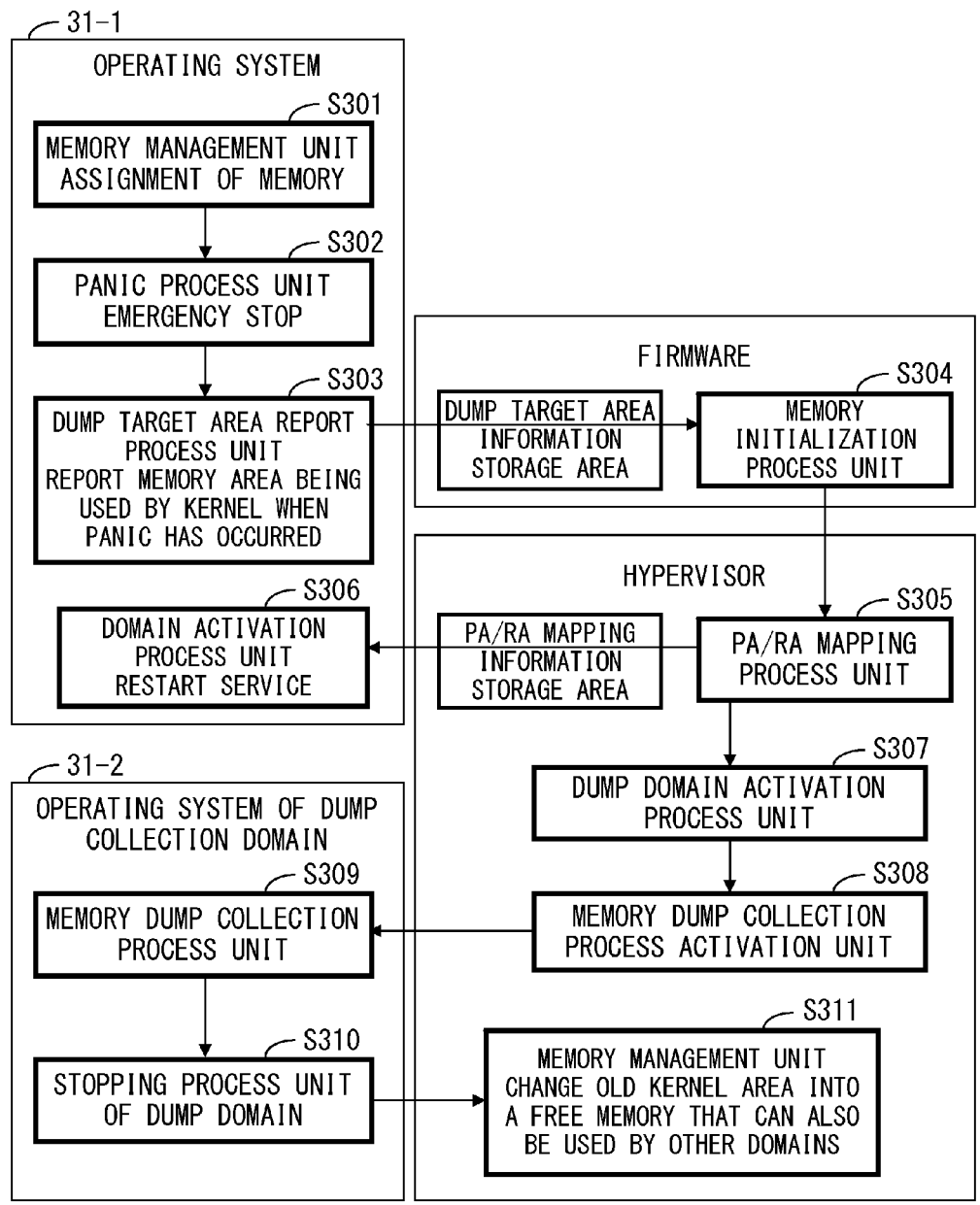
FIG. 4 illustrates a memory dump generation process according to a third embodiment.

FIG. 4 illustrates a memory dump generation process according to the third embodiment.

In step S301, the memory management unit 32 assigns a memory to be used by the kernel from the smallest (or the highest) real address (RA) in the memory 12-1 when the OS 31-1 is activated. In this method, the size of a memory area (dump target area) used by the kernel is made to be as small as possible.

In step S302, when the OS 31-1 has detected a fatal error, the panic process unit 38-1 brings the OS 31-1 to an emergency stop (panic).

In step S303, the dump target area report process unit 39-1 reports to the firmware 15 information (a combination of the initial address and size) of the memory area (dump target area) being used by the kernel of the OS 31-1 at the time of the occurrence of the emergency stop (panic). When the memory area being used by the kernel has been divided into a plurality of blocks, the initial addresses and sizes of all of the blocks are reported. The firmware 15 stores information of the dump target area in the dump target area information storage area 18.

In step S304, the memory initialization process unit 17 does not execute an initialization process on a dump target area being used by the kernel at the time of the occurrence of the emergency stop (panic) (i.e., data is not updated). In other words, a memory area being used by the kernel at the time of the occurrence of the stop (panic) is kept as it is.

In step S305, the PA/RA mapping process unit 20 changes, in a manner described as (1) and (2) below, the mapping between the physical address (PA) and the read address (RA) of the memory 12-1 of the domain 11-1 that has been brought to a panic. Thereby, even when the OS 31-1 is reactivated, data in the memory area being used by the kernel at the time of the occurrence of the panic is not overwritten.

(1) The physical address of the memory being used by the kernel at the time of the occurrence of the panic is not assigned to the real address of the domain (operating system) to be reactivated; and (2) The memory sizes that can be used by that domain (operating system) are made sure to be as identical to each other as possible before and after the reactivation.

However, when a physical memory that can be assigned to the domain (operating system) to be reactivated is smaller than a prescribed value, (1) is given priority.

The PA/RA mapping process unit 20 of the hypervisor assigns the physical memory area being used by the old kernel at the time of the occurrence of the panic to a dump collection domain different from the domain that was brought to the panic. The physical memory area used by the old kernel of the domain that was brought to the panic is mapped by a mapping changing unit of the hypervisor to the same real address as the address of the domain that was brought to the panic. The mapping of physical addresses and the mapping of real addresses are made sure to be identical between the domain brought to the panic and the domain for collecting memory dumps.

In step S306, the domain activation process unit 40-1 reactivates the OS 31-1 without writing dumps of the memory used by the kernel to a disk or the like.

In step S307, the dump domain activation process unit 22 activates the firmware of the dump collection domain 31-2. When an operating system is activated, the initialization process of the kernel or the like overwrites the contents in the memory area being used by the kernel at the time of the occurrence of a panic, and accordingly the operating system 31-2 is not activated.

In step S308 the memory dump collection process activation unit 23 calls a memory dump collection process unit 43-2 of the operating system 31-2 of the dump collection domain 11-2.

In step S309, the memory dump collection process unit 43-2 of the operating system 31-2 of the domain 11-2 reads the memory area (dump target area) being used by the kernel of the OS 31-1 at the time of the occurrence of the panic, and generates a dump file. Also, information of the dump target area (initial address, size, or the like) is read from the dump target area information storage area 18 or is obtained through a report from the firmware 15 or the hypervisor 16.

In step S310, a domain stopping process unit 41-2 of the operating system 31-2 stops down the domain 11-2. The free memory addition process unit 44-2 transmits a report to the memory management unit 19 of the hypervisor 16 so as to request that the memory management unit 19 change the memory area being used by the kernel at the time of the occurrence of the panic (i.e., a dumped area) into an unoccupied area that can be used, i.e., a free memory.

In step S311, the memory management unit 19 of the hypervisor 16 changes the memory area (dumped area) being used by the kernel at the time of the occurrence of the panic into a free memory that can also be used by other domains 11-2 and 11-3 (operating systems 31-2 and 31-3).

According to the third embodiment, when dumps are collected in a dump collection domain, dumps are not collected in a domain that detected an abnormality, but are collected in a different domain, reducing the possibility that secondary damage will be caused such as in a case where an abnormality is detected again in the dump collection process, causing a hang-up.

According to the third embodiment, when dumps are collected in a dump collection domain in a system that charges fees on the basis of the amount of hardware resources (CPUs, memories, disks, etc.) or a time period used by a user, such as Capacity on Demand (CoD), it is easy to avoid charging fees for hardware resources used for dump collection, and thereby fees can be made appropriate.

Next, the fourth embodiment will be explained.

In the fourth embodiment, after reactivating a domain (operating system) so as to restart its service after a panic, a memory area being used by the hypervisor at the time of the occurrence of a panic is read in the dump collection domain (dump collection operating system) so as to generate a memory dump file of the hypervisor.

In the explanations below, it is assumed that the domain (operating system) that was brought to a panic is the domain 11-1 (operating system 31-1), and that the dump collection domain (dump collection operating system) is the domain 11-2 (operating system 31-2).

FIG. 5 illustrates a memory dump generation process according to the fourth embodiment.

In step S401, the memory management unit 32 assigns a memory to be used by the kernel from the smallest (or the highest) real address (RA) in the memory 12-1 when the OS 31-1 is activated. In this method, the size of a memory area (dump target area) used by the kernel is made to be as small as possible.

In step S402, when the OS 31-1 has detected a fatal error, the panic process unit 38-1 brings the OS 31-1 to an emergency stop (panic).

In step S403, the dump target area report process unit 24 reports to the firmware 15 information (a combination of the initial address and size) of the memory area (dump target area) being used by the hypervisor 16 at the time of the occurrence of the emergency stop (panic). When the memory area being used by the hypervisor 16 has been divided into a plurality of blocks, the initial addresses and sizes of all of the blocks are reported. The firmware 15 stores information of the dump target area in the dump target area information storage area 18.

In step S404, the memory initialization process unit 17 does not execute an initialization process on a dump target area being used by the hypervisor 16 at the time of the occurrence of the emergency stop (panic) (i.e., data is not updated). In other words, a memory area being used by the hypervisor 16 at the time of the occurrence of the emergency stop (panic) is kept as it is.

In step S405, the PA/RA mapping process unit 20 changes, in a manner described as (1) and (2) below, the mapping between the physical address (PA) and the read address (RA) of the memory 12-1 of the domain 11-1 that has been brought to a panic. Thereby, even when the OS 31-1 is reactivated, data in the memory area being used by the hypervisor 16 at the time of the occurrence of the panic is not overwritten.

(1) The physical address of the memory being used by the hypervisor at the time of the occurrence of the panic is not assigned to the real address of the domain (operating system) to be reactivated; and (2) The memory sizes that can be used by that domain (operating system) are made sure to be as identical to each other as possible before and after the reactivation.

However, when a physical memory that can be assigned to the domain (operating system) to be reactivated is smaller than a prescribed value, (1) is given a priority.

In step S406, the domain activation process unit 40-1 reactivates the OS 31-1 without writing dumps of the memory used by the hypervisor 16 to a disk or the like.

In step S407, after the OS 31-1 is reactivated, a dump target memory read process activation unit 47-2 of the operating system 31-2 calls the dump target memory read process unit 25 of the hypervisor 16.

In step S408, the dump target memory read process unit 25 reads the memory area being used by the hypervisor 16 at the time of the occurrence of the emergency stop (panic), and outputs the data in the memory area to the operating system 31-2. Information of the dump target area (initial address, size, or the like) is obtained by reading information from the dump target area information storage area 18.

In step S409, the memory dump collection process unit 43-2 writes, to a file, the data in the memory area read by the dump target memory read process unit 25, and generates a dump file.

In step S410, the memory management unit 19 of the hypervisor 16 changes the memory area (dumped area) being used by the hypervisor 16 at the time of the occurrence of the panic into a free memory that can also be used by other domains 11-2 and 11-3 (operating systems 31-2 and 31-3).

According to the fourth embodiment, when dumps are collected in a collection domain, dumps are not collected in a domain that detected an abnormality, but are collected in a different domain, reducing the possibility that secondary damage will be caused such as in a case where an abnormality is detected again in the dump collection process, causing a hang-up.

According to the fourth embodiment, when dumps are collected in a dump collection domain in a system that charges fees on the basis of the amount of hardware resources (CPUs memories, disks, etc.) or a time period used by a user, such as Capacity on Demand (CoD), it is easy to avoid charging fees for hardware resources used for dump collection, and thereby fees can be made appropriate.

In the above, a plurality of embodiments have been explained. However, those embodiments are not limited to a device, an apparatus, or a method, and can also be configured as a program, and can also be configured as a computer-readable recording medium that has stored such a program therein. For a recording medium, for example, a flexible disk (FD), a hard disk drive, an optical disk, a magneto-optical disk, a CD-ROM, a CD-R, a DVD-ROM, a DVD-RAM, magnetic tape, a non-volatile memory card, etc., can be used.

For example, a program according to an embodiment is read from a recording medium that has stored the program therein, and is stored in the memory 12 or the storage unit 14. The CPU 15 reads the program from the memory 12 or the storage unit 14 so as to execute it, and thereby performs the various processes in the above described embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a memory; and
a processor that executes an operating system, wherein:
the processor includes:
- a panic process unit configured to stop the operating system when the operating system has detected an error;
- a mapping process unit configured to assign, to the operating system stopped by the panic process unit, a second memory area which is other than a first memory area used by a kernel of the operating system before stop or by a hypervisor that controls the operating system before stop of the operating system;
- a reactivation process unit configured to reactivate the operating system by using the second memory area as a usage area;
- a memory attaching process unit configured to attach the first memory area in the operating system after the operating system is reactivated; and
- a memory dump process unit configured to read data in the first memory area, and to write the data to a dump file after the first memory area is attached.

2. The information processing apparatus according to claim 1, wherein:
the mapping process unit assigns, to the operating system stopped by the panic process unit, the second memory area which is other than the first memory area used by the kernel of the operating system before stop.

3. An information processing apparatus, comprising:
a memory; and
a processor that executes an operating system, wherein:
the processor includes:
- a memory management unit configured to assign a first memory area used by a kernel of the operating system from a smallest or a highest real address of the memory;
- a panic process unit configured to stop the operating system when the operating system has detected an error;
- a mapping process unit configured to assign, to the operating system stopped by the panic process unit, a second memory area which is other than the first memory area used by the kernel of the operating system before stop;
- a reactivation process unit configured to reactivate the operating system by using the second memory area as a usage area; and
- a memory dump process unit configured to read data in the first memory area, and to write the data to a dump file after the operating system is reactivated, wherein:
the memory dump process unit is executed by an operating system other than the reactivated operating system.

4. An information processing apparatus, comprising:
a memory; and
a processor that executes an operating system, wherein:
the processor includes:
- a panic process unit configured to stop the operating system when the operating system has detected an error;
- a dump target area report unit configured to report, to firmware, dump target information including an initial address and a size of a first memory area used by a hypervisor when the operating system detects the error;
- a dump target area information storage area in which the dump target information reported from the dump target area report unit is stored by the firmware;
- a mapping process unit configured to assign, based on the dump target information, to the operating system stopped by the panic process unit, a second memory area which is other than the first memory area used by the hypervisor that controls the operating system before stop of the operating system;
- a reactivation process unit configured to reactivate the operating system by using the second memory area as a usage area; and
- a memory dump process unit configured to read data in the first memory area, and to write the data to a dump file after the operating system is reactivated, wherein:
the memory dump process unit is executed by an operating system other than the reactivated operating system.

5. The information processing apparatus according to claim 4, wherein:
after receiving the dump target information from the dump target area information, the firmware keeps the first memory area used by the hypervisor before the operating system is stopped as it is until the memory dump process unit completes dump process.

6. The information processing apparatus according to claim 4, wherein:
the mapping process unit assigns to the operating system the second memory area that is approximately same in size as the first memory area.

7. A memory dump method for an information processing apparatus that executes an operating system, the method comprising:
stopping the operating system when the operating system has detected an error;
assigning, to the operating system that was stopped, a second memory area which is other than a first memory area used by a kernel of the operating system before stop or by a hypervisor that controls the operating system before stop of the operating system;
reactivating the operating system by using the second memory area as a usage area;
attaching the first memory area in the operating system after the operating system is reactivated; and
reading data in the first memory area, and writing the data to a dump file after the first memory area is attached.

8. The memory dump method according to claim 7, wherein:
in the assigning process, the second memory area which is other than the first memory area used by the kernel of the operating system before stop is assigned to the operating system that was stopped.

9. A memory dump method for an information processing apparatus that executes an operating system, the method comprising:
assigning a first memory area used by a kernel of the operating system from a smallest or a highest real address of a memory;
stopping the operating system when the operating system has detected an error;
assigning, to the operating system that was stopped, a second memory area which is other than a first memory area used by a kernel of the operating system before stop;
reactivating the operating system by using the second memory area as a usage area; and reading data in the first memory area, and writing the data to a dump file after the operating system is reactivated, wherein:
the process of writing to the file is executed by an operating system other than the reactivated operating system.

10. A memory dump method for an information processing apparatus that executes an operating system, the method comprising:
stopping the operating system when the operating system has detected an error;
reporting to firmware dump target information including an initial address and a size of a first memory area used by a hypervisor when the operating system detects the error;
storing the dump target information;
assigning, based on the dump target information, to the operating system that was stopped, a second memory area which is other than the first memory area used by the hypervisor that controls the operating system before stop of the operating system;
reactivating the operating system by using the second memory area as a usage area; and
reading data in the first memory area, and writing the data to a dump file after the operating system is reactivated, wherein:
the process of writing to the file is executed by an operating system other than the reactivated operating system.

11. The memory dump method according to claim 10, further comprising:
keeping the first memory area used by the hypervisor before the operating system is stopped as it is until the memory dump process unit completes dump process after the dump target information is reported.

12. The memory dump method according to claim 10, wherein:
the first memory area is approximately same in size as the second memory.

13. A computer-readable non-transitory recording medium having recorded therein a memory dump program that causes an information processing apparatus for executing an operating system to execute a process, the process comprising:
stopping down the operating system when the operating system has detected an error;
assigning, to the operating system that was stopped, a second memory area which is other than a first memory area used by a kernel of the operating system before stop or by a hypervisor that controls the operating system before stop of the operating system;
reactivating the operating system by using the second memory area as a usage area;
attaching the first memory area in the operating system after the operating system is reactivated; and
reading data in the first memory area, and writing the data to a dump file after the first memory area is attached.

14. The computer-readable non-transitory recording medium according to claim 13, wherein:
in the assigning process, the second memory area which is other than the first memory area used by the kernel of the operating system before stop is assigned to the operating system that was stopped.

15. A computer-readable non-transitory recording medium having recorded therein a memory dump program that causes an information processing apparatus for executing an operating system to execute a process, the process comprising:
assigning a first memory area used by a kernel of the operating system from a smallest or a highest real address of a memory;
stopping down the operating system when the operating system has detected an error;
assigning, to the operating system that was stopped, a second memory area which is other than the first memory area used by the kernel of the operating system before stop;
reactivating the operating system by using the second memory area as a usage area; and
reading data in the first memory area, and writing the data to a dump file after the operating system is reactivated, wherein:
the process of writing to the file is executed by an operating system other than the reactivated operating system.

16. A computer-readable non-transitory recording medium having recorded therein a memory dump program that causes an information processing apparatus for executing an operating system to execute a process, the process comprising:
stopping down the operating system when the operating system has detected an error;
reporting to firmware dump target information including an initial address and a size of a first memory area used by a hypervisor when the operating system detects the error;
storing the dump target information;
assigning, based on the dump target information, to the operating system that was stopped, a second memory area which is other than the first memory area used by the hypervisor that controls the operating system before stop of the operating system;
reactivating the operating system by using the second memory area as a usage area; and
reading data in the first memory area, and writing the data to a dump file after the operating system is reactivated, wherein:
the process of writing to the file is executed by an operating system other than the reactivated operating system.

17. The non-transitory recording medium according to claim 16, wherein:
keeping the first memory area used by the hypervisor before the operating system is stopped as it is until the memory dump process unit completes dump process after the dump target information is reported.

18. The non-transitory recording medium according to claim 16, wherein:
the first memory area is approximately same in size as the second memory.

* * * * *